United States Patent [19] [11] Patent Number: 4,811,110
Ohmura et al. [45] Date of Patent: Mar. 7, 1989

[54] REFLECTION-TYPE OVERHEAD PROJECTOR

[75] Inventors: Hiroshi Ohmura; Seimei Ushiro, both of Tokyo, Japan

[73] Assignee: Fuji Photo Film Co., Ltd., Kanagawa, Japan

[21] Appl. No.: 182,725

[22] Filed: Apr. 18, 1988

[30] Foreign Application Priority Data

Apr. 18, 1987 [JP] Japan .............................. 62-58850[U]

[51] Int. Cl.⁴ .............................................. H04N 1/10
[52] U.S. Cl. ...................................... 358/256; 353/24; 353/119; 353/122; 358/287; 358/296; 358/294; 358/293
[58] Field of Search ............... 358/293, 256, 287, 296, 358/294; 353/24, 199, 122

[56] References Cited

U.S. PATENT DOCUMENTS

| | | | |
|---|---|---|---|
| 4,319,283 | 3/1982 | Ozawa | 358/296 |
| 4,442,460 | 4/1984 | Kurata | 358/287 |
| 4,607,291 | 8/1986 | Oono | 358/293 |
| 4,609,779 | 9/1986 | Rogers | 358/296 |
| 4,626,924 | 12/1986 | Watanabe | 358/293 |
| 4,636,871 | 1/1987 | Oi | 358/296 |

Primary Examiner—Howard W. Britton
Attorney, Agent, or Firm—Young & Thompson

[57] ABSTRACT

A reflection-type overhead projector having a projection lamp and projection lens-and-mirror system disposed above a base on a gooseneck arm for projecting a transparency placed on the base on a remote screen. The overhead projector has a copying device incorporated therein for making a copy from a reflective original on a secondary original or a transparency, which comprises an image-scanning head movable lengthwise over the reflective original placed on a Fresnel mirror on the base to provide image signals; a mirror attached to the image scanning head for directing light from the projection lamp onto the reflective original just below the image scanning head; and a thermal printing head for thermally printing an image of the reflective original on a secondary original or a transparency according to the image signals.

11 Claims, 4 Drawing Sheets

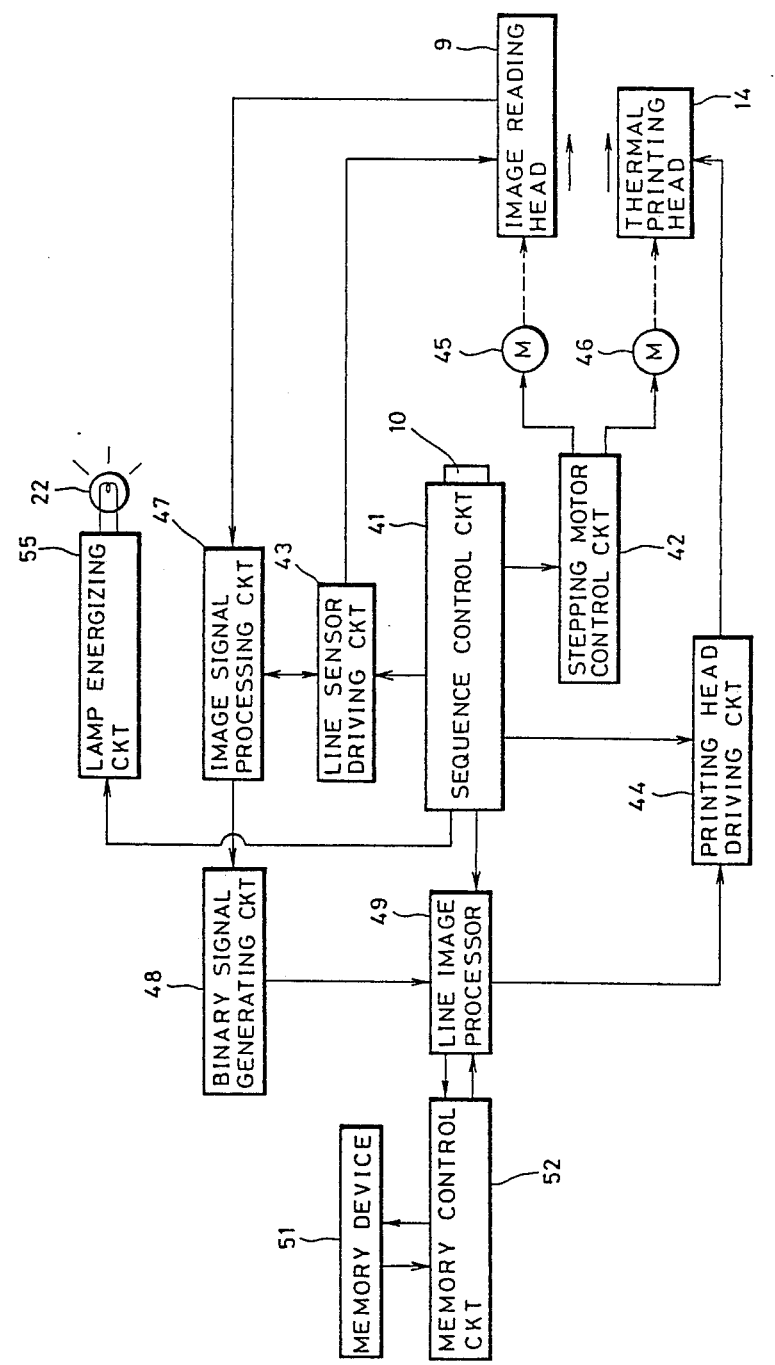

REFLECTION-TYPE OVERHEAD PROJECTOR

BACKGROUND OF THE INVENTION

The present invention relates to a reflection-type overhead projector and, more particularly, to a reflection-type overhead projector which can project transparencies.

Images which can be projected onto a screen with an overhead projector are carried by transparencies with letters and pictures. With, for example, a reflection-type overhead projector, a transparency to be projected is placed on a glass stage comprising a Fresnel mirror and illuminated from above. The image is reflected by the Fresnel mirror and projected by a mirror-and-lens system onto a remote screen.

For preparing materials or originals to be projected with such a reflection-type overhead projector, which should be in the form of transparencies, there is known an overhead projector with a copying device adapted to make a transparency by reflection from a non-transparent but reflecting original. In such an overhead projector, a reflecting original such as a hard copy (which is hereinafter referred to as a reflecting original) is placed on the glass stage in order to scan the reflecting original with an image sensor comprising a CCD line sensor. According to image signals from the image sensor, an image-forming head draws the image on a transparent material so as to provide a transparency. In such an overhead projector, there are used as recording materials heat-sensitive transparent sheets which contain particles or grains which blacken when heated. For blackening these particles, a thermal printing had is used. The combination of the heat-sensitive sheet and the thermal printing head provides an image-recording mechanism which is simple and thus makes the overhead projector practical.

A problem with such an overhead projector is in that the reflecting original has to be illuminated in order to read the image thereon by means of an image-reading head. The reflecting original can be illuminated by a lamp incorporated in the image-reading head. However, the incorporation of the lamp in the reading head results in a large size of image reading head. Furthermore, because the image reading head is unavoidably moved over the reflecting original in order to read the image, it is necessary not only to provide a moving mechanism for the large size of image reading head but also to use an extensible wire for connecting the image-reading head and a power source disposed remote from the image-reading head. Alternatively, it may be convenient to fix the image receiving head to the illuminating lamp as in the case of facsimile machines, electronic writing boards or the like. In this case, the reflecting original should be moved while being maintained flat, which results in a complicated mechanism for moving the reflecting original.

OBJECT OF THE INVENTION

It is, therefore, an object of the present invention to provide a reflection-type overhead projector equipped with a copying mechanism for making a projectable transparency from a reflecting original.

It is another object of the present invention to provide a portable reflection-type overhead projector which is light in weight and simple in construction.

SUMMARY OF THE INVENTION

The above objects of the present invention are accomplished by providing a reflection-type overhead projector provided with an image-reading head movable over a reflecting original, the image-reading head having a mirror for directing a beam of light from a projection lamp below the image-reading head to illuminate the reflecting original with a line of light.

According to a preferred embodiment of the present invention, the mirror attached to the outside of the image receiving head is inclined.

BRIEF DESCRIPTION OF THE DRAWINGS

FIG. 4 is a block circuit diagram of a copying section incorporated in the overhead projector of FIG. 1.

DETAILED DESCRIPTION OF THE INVENTION

Figure 1:
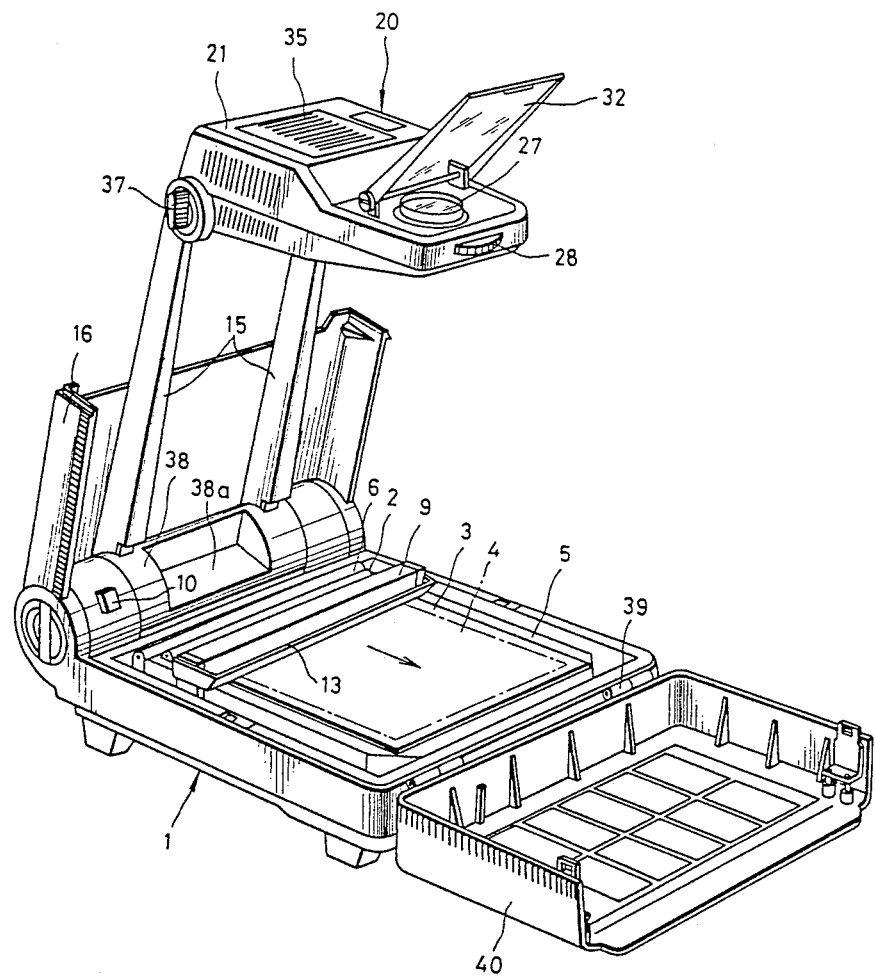
FIG. 1 is a perspective view showing the overhead projector of an embodiment of the present invention.
Figure 2:
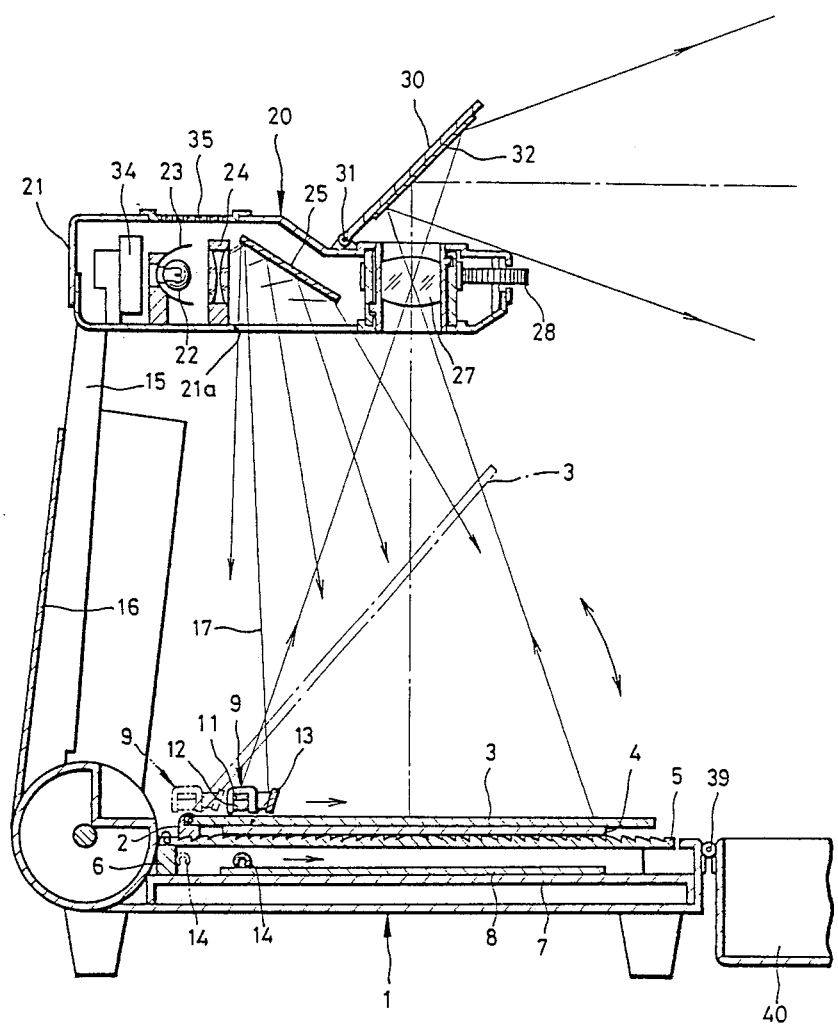
FIG. 2 is a sectional view of the overhead projector of FIG. 1.

Referring now to FIGS. 1 and 2, shown therein is a reflection-type overhead projector embodying the present invention. As shown, the overhead projector has a box-shaped base 1 with a Fresnel mirror 5 pivoted at 6 to the base 1. Over the Fresnel mirror 5 there is a transparent cover 3 comprised by, for example, a transparent glass plate pivoted at 2 to the Fresnel mirror 5 for exposing and covering the Fresnel mirror 5.

Between the cover 3 and the Fresnel mirror 5, a reflecting original 4 is placed in position and maintained flat. Within the base 1 there is an upper support 7 on which a heat-sensitive transparent sheet 8 is placed. For access to the inner support 7, the Fresnel mirror 5 is opened, that is, raised. This heat-sensitive transparent sheet 8 is a transparent plastic base sheet, such as a polyethylene base sheet, with a conventional layer of particles which blacken when heated, and has an appropriate size (for example A4 size).

Figure 3:
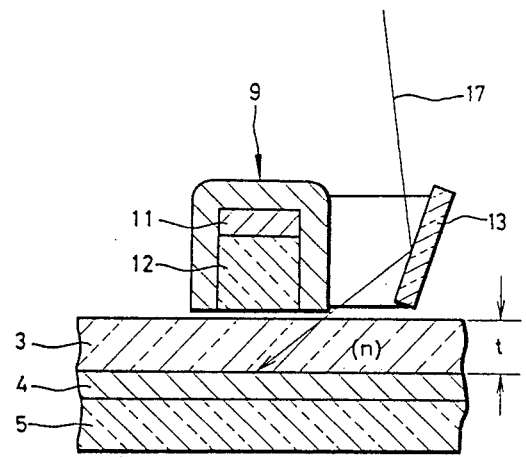
FIG. 3 is an enlarged view showing an image reading head used in the overhead projector of FIG. 1.

On the base 1 there is a rectangular scanning or image reading head 9 movable over the cover 3 from an initial position shown in FIG. 1 toward the opposite side as shown by an arrow. Attached to the scanning or image reading head 9 is a rectangular mirror 13 extending lengthwise of head 9 and which reflects and directs the light beam 17 emanating from a projection lamp 22 disposed in a projector head 20 to the original 4 on the Fresnel mirror 5. The scanning head 9, as is shown in detail in FIG. 3, has a line sensor 11 comprising CCDs (Charge Coupled Devices) and a selfox lens 12 incorporated therein. This lens 12 has a focal length determined in consideration of the thickness (t) and the refraction index (n) of the cover 3. The mirror 13 is so inclined at an angle as to direct the light beam 17 to part of the reflecting original 4 just under the moving scanning head 9. When the mirror 13 illuminates the reflecting original 4 with a line of light, the line sensor 11 detects a line image of the reflecting original formed thereon by the lens 12. Owing to the provision of the mirror 13 attached to the scanning head or image reading head 9, the projection lamp 22 in the projection head 20 can be used for scanning, resulting in the overhead projector being adapted to be made compact and portable.

On the inner support 7 there is a thermal printing head 14 movable over the heat-sensitive transparent sheet 8. Head 14 extends transversely, namely in the direction perpendicular to the surface of the drawing. This thermal printing head 14 moves in the direction shown by an arrow in FIG. 2 from its initial position shown by a dotted line in FIG. 2 to the opposite side of sheet 8.

Provided at the rear end of the base 1 is a pair of foldable gooseneck arms 15 with a rear half cover 16 attached thereto. Above the base 1 on the gooseneck arms 15 is a foldably-supported housing 21 for the projection head 20. Within the housing 21 there are a projection lamp 22 capable of emitting a large amount of light and a mirror-and-lens system, with their associated elements. The light emanating from the lamp 2 travels toward a condenser lens 24 partly directly and partly after being reflected by a mirror 23. The light that has passed through the condenser lens 24 is reflected by a mirror 25 to travel downwardly passing through an opening 21a formed in the bottom of the housing 21, so as to illuminate the original on the Fresnel mirror 5.

Within the housing 21, there is a projection lens 27 for forming an image of a transparency on the Fresnel mirror 5 of the base table 1 on a vertical or slightly angled remote screen (not shown). Above the projection lens 27 on the housing 21 is a swingable holder 30 for a mirror 32 which reflects the light beam at a desired angle in the forward direction. In association with the projection lens 27 there is a knob 28 for adjusting the projection lens 27 to focus the image of the transparency on the remote screen. Behind the lamp 22 in the housing 21 there is a cooling fan 34 for discharging heat generated by the lamp 22 through slits 35 formed in the top wall of the housing 21.

This projection head 20 is raised and positioned substantially parallel to the base 1 in use. For easy positioning, between the gooseneck arms 15 and the projection head housing 21 there is a click stop mechanism that is not shown but that is well known in the art. The raised projection head housing 21 is releasably locked by means of a locking knob 37. Upon loosening the locking knob 37, the housing 21 can be folded between the gooseneck arms 15. When the housing 21 is folded, the front end of the housing 21 will be seated in a recess 38a formed in a sleeve shaft member 38 integrally formed with the gooseneck arms 15.

At the front end of the base 1 there is provided a front half cover 40 on hinges 39 which covers, together with the rear half cover 16, the gooseneck arms 15 and the projection head housing 21 when these are folded completely thereinside. Due to the provision of the front and rear half covers 40 and 16, the folded overhead projector takes the form of a box, making it easy to carry about or to store. When folding the gooseneck arms and the projection head housing 21, the image-reading head 9 and the thermal printing head 14 are returned to their initial positions shown by dotted lines in FIG. 2.

The operation of the overhead projector will be described in detail with reference to FIG. 4. As is there shown, when making a transparency to be projected by the overhead projector from a reflecting original such as a hard copy, the Fresnel mirror 5 is opened and a heat-sensitive transparent sheet 8 is placed on the inner support 7. After closing the Fresnel mirror 5 to cover the heat-sensitive transparent sheet 8, the transparent cover 3 is opened so as to allow a reflecting original 4 to be placed on th Fresnel mirror 5. Upon closing the transparent cover 3, the overhead projector becomes ready for copying.

A copy start key 10 is pushed to initiate the production of a transparency. Thereupon, a sequence control circuit 41 executes a sequential control of the copying operation. For this sequential control of the operation, the sequence control circuit 41 sends start signals to various control circuits, namely a lamp-energizing circuit 55, a stepping motor control circuit 42, a line sensor driving circuit 43, and a printing head driving circuit 44. The lamp-energizing circuit 55 receives the start signal, causing the lamp 22 to emit light. The stepping motor control circuit 42, upon receiving the start signal, causes stepping motors 45 and 46 to begin to rotate so as to move the image-reading head 9 and the thermal printing head 14 over the transparent cover 3 and the heat-sensitive transparent sheet 8, respectively. When the image-reading head 9 reaches a position from which scanning is commenced, the line sensor driving circuit 43 provides the line sensor 11 and an image signal processing circuit 47 with start signals, respectively.

As the image-reading head 9 moves over the transparent cover 3, the mirror 13 attached to the image-reading head 9 reflects the light 17 from the lamp 22 to direct it under the image reading head 9, illuminating the reflecting original 4 placed under the transparent cover 3, with a transverse line of illumination. As a result, a line image of the reflecting original 4 is focused on the line sensor 11 through the selfox lens 12. The line sensor 11 provides sequential image signals every line image which in turn are sent to the image signal processing circuit 47. With reference to driving signals provided by the line sensor driving circuit 43, the image signal processing circuit 47 processes the sequential image signals to provide analog line image signals for the respective line images and sends them to a binary signal generating circuit 48.

This binary signal generating circuit 48 transforms the analog image signals into two binary image signals with reference to a predetermined threshold level. A line image processor 49 transmits the binary image signals to memory device 51 through a memory control circuit 52. The memory device 51 is used as a buffer memory to temporarily memorize binary image signals for, for example, several tens of line images. The binary image signals in the memory device 51 are sequentially retrieved by the line image processor 49 and sent to the printing head driving circuit 44.

The printing head driving circuit 44 receives synchronous signals from the sequence control circuit 41 which supplies driving signals to the stepping motor 46 to drive the thermal printing head 14 according to the binary image signals sent thereto, thereby forming the image of the reflecting original on the heat sensitive transparent sheet 8 in a well known thermal recording manner.

When a copy of the reflecting original, namely a transparency, on the heat sensitive sheet 8 is completed, the stepping motors 45 and 46 are rotated in the reverse direction to return the image reading head 9 and the thermal printing head 14 to their respective initial positions. Then, the lamp 22 is turned off and the sequential control of operation for making a transparency is concluded.

The thus-produced transparency is then taken out and is placed between the Fresnel mirror 5 and the transparent cover 3 in place of the reflecting original 4. Then the lamp 22 is again turned on to project an image of the transparency on the screen via Fresnel mirror 5, lens 27 and mirror 32.

Figure 5:
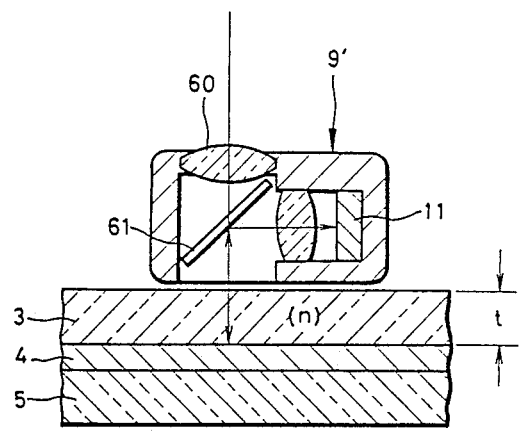
FIG. 5 is an enlarged view showing an alternative image reading head.

FIG. 5 shows an alternative embodiment of the scanning or image reading head 9. As shown, the scanning head 9' has a condenser lens 60, having its optical path perpendicular to the Fresnel mirror 5, disposed in the top wall thereof and a half mirror 61 inclined at 45 with respect to the optical axis of the condenser lens 60. The light from the lamp 22 is condensed by the condenser lens 60 and passes through the half mirror 61 to illuminate the reflecting original 4 under the transparent cover 3. The light reflected from the reflecting original 4 is reflected at a right angle by the half mirror 61 and directed to the line sensor 11 disposed at a right angle with respect to the optical path of the condenser lens 60.

In any embodiment of the device described above, it is possible to make enlarged or reduced transparencies at various rates from reflecting originals by varying the relative speed of movement between the image reading head 9 and the thermal printing head 14.

Although the present invention has been fully described as to preferred embodiments thereof with reference to the accompanying drawings, it will be apparent to those skilled in the art that various changes and modifications may be made in the form, details, arrangement and proportions of the parts without departing from the scope of the present invention, which generally stated, consists in the matter set forth in the accompanying claims.

What is claimed is:

1. In a reflection-type overhead projector which has projection means disposed above a base on which a transparency is placed, said projection means including a projection light source for illuminating the transparency placed on the base and a mirror-and-lens system for projecting an image of the illuminated transparency on a remote screen; the improvement comprising:
   a Fresnel mirror on said base on which a reflecting original can be placed;
   means movable over said Fresnel mirror for scanning said reflecting original in a transverse line to provide image signals;
   a mirror attached to said means for directing light emanating from said projection light source onto said reflecting original below said means; and
   printing means for printing an image of said reflecting original on a transparent sheet material responsive to said image signals provided by said means, thereby making a transparency to be projected with said overhead projector.

2. An overhead projector as defined in claim 1, further comprising a transparent cover pivotally mounted on said base so as to cover and uncover said Fresnel mirror with said reflecting original between said transparent cover and said Fresnel mirror plate.

3. An overhead projector as defined in claim 1, and means within said base below and parallel to said Fresnel mirror for supporting said transparent sheet material.

4. An overhead projector as defined in claim 3, and means mounting said Fresnel mirror for vertical swinging movement on and relative to said base to cover and uncover said supporting means.

5. An overhead projector as defined in claim 1, wherein said means includes a line image sensor.

6. An overhead projector as defined in claim 5, wherein said means comprises an open-bottomed housing mounting therein said line image sensor which receives the light reflected from said reflecting original and carrying on one side thereof said mirror inclined at an angle.

7. An overhead projector as defined in claim 5, wherein said means comprises a housing supporting a half mirror inclined at 45° with respect to said Fresnel mirror so as to pass light emanating from said projecting light source straight down and to reflect the light reflected from said reflecting original at a right angle and supporting said line image sensor to receive said light reflected by said half mirror.

8. An overhead projector as defined in claim 1, wherein said transparent sheet material is placed within said base.

9. An overhead projector as defined in claim 8, wherein said printing head is movable lengthwise over said transparent sheet material.

10. An overhead projector as defined in claim 9, wherein said transparent sheet material contains heat sensitive particles adapted to be blackened by heat.

11. An overhead projector as defined in claim 10, wherein said printing means is a thermal printing head.

* * * * *